(12) United States Patent
Tan et al.

(10) Patent No.: US 8,493,761 B2
(45) Date of Patent: Jul. 23, 2013

(54) INVERTER CIRCUIT HAVING RELATIVELY HIGHER EFFICIENCY

(75) Inventors: Jingtao Tan, Shanghai (CN); Degang Yi, Shanghai (CN); Fei Lv, Shanghai (CN); Lei-Ming Lee, Taoyuan Hsien (TW); Jianping Ying, Shanghai (CN); Wen-Yin Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 858 days.

(21) Appl. No.: 12/636,005

(22) Filed: Dec. 11, 2009

(65) Prior Publication Data

US 2010/0149846 A1  Jun. 17, 2010

(30) Foreign Application Priority Data

Dec. 12, 2008  (TW) ................. 97148651 A

(51) Int. Cl.
*H02M 7/5387* (2007.01)
(52) U.S. Cl.
USPC .......................................... 363/132

(58) Field of Classification Search
USPC ................ 363/56.01, 56.02, 97, 98, 131, 132
See application file for complete search history.

(56) References Cited

U.S. PATENT DOCUMENTS

| | | | |
|---|---|---|---|
| 7,423,894 B2* | 9/2008 | Ilic ................................ | 363/132 |
| 7,440,300 B2* | 10/2008 | Konishi et al. ................ | 363/132 |
| 8,270,191 B2* | 9/2012 | Zhu et al. ...................... | 363/132 |
| 2007/0109822 A1* | 5/2007 | Kuan ........................ | 363/21.14 |
| 2011/0013438 A1* | 1/2011 | Frisch et al. .................. | 363/131 |

* cited by examiner

*Primary Examiner* — Matthew Nguyen
(74) *Attorney, Agent, or Firm* — Volpe and Koenig, P.C.

(57) ABSTRACT

The configurations of an inverter circuit are provided in the present invention. The proposed circuit includes a first bridge arm having a first sub-bridge arm with a first switch and a first middle point coupled to the first switch, and a second sub-bridge arm with a second switch and a second middle point coupled to the second switch, a first inductor having a first terminal coupled to the first middle point and a second terminal, and a second inductor having a first terminal coupled to the second middle point, and a second terminal coupled to the second terminal of the first inductor and outputting an AC voltage.

18 Claims, 5 Drawing Sheets

INVERTER CIRCUIT HAVING RELATIVELY HIGHER EFFICIENCY

FIELD OF THE INVENTION

The present invention relates to an inverter circuit with a relatively higher efficiency. More particularly, the present invention relates to an inverter circuit with a relatively higher efficiency and being applied to power systems of renewable energy (such as wind energy, solar energy and so on).

BACKGROUND OF THE INVENTION

Following the excessive consumption of the mineral fuels such as the petroleum and natural gas, the prices of fuels are continuously increased, and the influences towards the environment caused by the excessive consumption of the mineral fuels are more and more significantly at the same time. To meet the economy and environmental protection requirements, the alternative energy sources are sought globally, and employing the renewable energy (such as wind energy, solar energy and so on) to generate the electric power is the most important development direction. Although being developed for many years, there are still drawbacks currently in employing solar cell to generate the electric power such as excessive costs and lower efficiency. FIG. 1 shows a schematic circuit diagram of a conventional non-isolated inverter circuit. In FIG. 1, the inverter circuit includes a regulator connected to an input DC power source having a positive and a negative terminals and providing a DC voltage Vin, a capacitor Cp having a first terminal coupled to the negative terminal of the DC power source and a second terminal coupled to the ground, a first to a fourth switches, S1-S4, employed to form a single-phase full-bridge inverter, a first inductor having a first terminal coupled to a first middle point being connected to the first switch S1 and the second switch S2, and a second terminal electrically connected to an AC power source being connected to a second middle point of switches S3 and S4, and the voltage and the current of the AC power source are $V_G$ and $I_G$ respectively. FIG. 1 is also a circuit diagram of a solar cell power system. For example, an output voltage of a solar cell board, Vin, is outputted to an input terminal of the regulator, the output of the regulator reaches a stable DC voltage such as 400V after voltage boosting performed by the regulator, the stable DC voltage is converted to an AC voltage, $V_G$, by an inverter, and $V_G$ is outputted to the power network. The regulator in FIG. 1 is well-known to the public, there are various methods to realize the regulator, and they are omitted here. The inverter circuit in FIG. 1 employs the non-isolated type configuration, so a transformer is saved, and the first to the fourth switches, S1-S4, are all power switches and could be either MOSFET, or insulated-gate bipolar transistor (IGBT) etc. If IGBTs are employed, the turn-on losses of which are quite large since the turn-on voltage drop is pretty high, usually exceeding 2V, that will cause the lower efficiency of the inverter employing the IGBT, and the efficiency is lower than 97% according to the existing technologies. If four MOSFETs are employed instead of four IGBTs, the turn-on losses of MOSFETs are decreased, but the loss of the body diode included in the MOSFET at the stage of freewheeling current is increased. S3 is constantly turned on and S1 is used as a PWM switch to regulate the output voltage when the AC output voltage $V_G$ is in the positive-half cycle and is positive. The current flows through S1-L1-L3 when S1 is turned on and the current flows through the body diode of S2-L1-S3 when S1 is turned off, results in quite large loss due to the poor characteristic of the body diode of S2, and is disadvantageous to the increase of the efficiency. When the AC output voltage $V_G$ is in the negative-half cycle and is negative, S4 is constantly turned on and there is also a stage of freewheeling current of the body diode of S1 while S2 is used as a PWM switch, and also results in a great deal of loss.

Keeping the drawbacks of the prior arts in mind, and employing experiments and research full-heartily and persistently, the applicant finally conceived an inverter circuit having a relatively higher efficiency.

SUMMARY OF THE INVENTION

It is therefore an object of the present invention to provide an inverter circuit having a relatively higher efficiency. When a PWM switch of the inverter circuit is turned off, there is an independent diode being employed to realize the freewheeling current instead of a body diode inside the PWM switch such that the efficiency of the inverter circuit is increased. And through employing three inductors with relatively smaller inductances, both the total volume and the total cost of the inverter circuit are decreased.

According to the first aspect of the present invention, an inverter circuit comprises a first bridge arm having a first sub-bridge arm having a first switch, a first diode, and a first middle point coupled to the first switch and the first diode, and a second sub-bridge arm having a second switch, a second diode, and a second middle point coupled to the second switch and the second diode, a first inductor having a first terminal coupled to the first middle point, and a second terminal, and a second inductor having a first terminal coupled to the second middle point, and a second terminal coupled to the second terminal of the first inductor and outputting an AC voltage.

Preferably, the circuit further comprises a second bridge arm having a third and a fourth switches and a third middle point, wherein the third and the fourth switches are coupled to the third middle point, and the third middle point outputs the AC voltage.

Preferably, the circuit further comprises a first and a second input terminals, wherein each of the first to the fourth switches has a first, a second and a control terminals, each of the first and the second diodes has an anode and a cathode, the second terminal of the first switch and the cathode of the first diode are coupled to the first middle point, the first terminal of the second switch and the anode of the second diode are coupled to the second middle point, the first terminal of the third switch and the second terminal of the fourth switch are coupled to the third middle point, the first terminal of the first switch, the first terminal of the fourth switch and the cathode of the second diode are coupled to the first input terminal, and the second terminal of the second switch, the second terminal of the third switch and the anode of the first diode are coupled to the second input terminal.

Preferably, the first and the second input terminals receive a DC voltage.

Preferably, the DC voltage is an output voltage of a solar cell.

Preferably, the circuit further comprises a regulator receiving a first DC voltage and generating a second DC voltage, wherein the first and the second input terminals receive the second DC voltage.

Preferably, the first DC voltage is an output voltage of a solar cell.

Preferably, each of the first to the fourth switches is a MOSFET.

Preferably, each of the first and the second switches is a CoolMOS device, and each of the third and the fourth switches is an ordinary MOSFET.

Preferably, the circuit further comprises a third inductor having a first terminal coupled to the second terminal of the second inductor and a second terminal outputting the AC voltage, wherein each of the first to the third inductors has an inductance, the inductance of the third inductor is larger than both of the respective inductances of the first and the second inductors, the first and the second switches have a first and a second body diodes respectively, the inductance of the first inductor has a lower limit set to prevent from a turn-on of the second body diode when the first switch is turned off and the inductance of the second inductor has a lower limit set to prevent from a turn-on of the first body diode when the second switch is turned off.

Preferably, the first switch is used as a first PWM switch, the first diode provides a first freewheeling current when the first switch is turned off, and the third switch is turned on constantly while the AC voltage is in a positive half-cycle, the second switch is used as a second PWM switch, the second diode provides a second freewheeling current when the second switch is turned off, and the fourth switch is turned on constantly while the AC voltage is in a negative half-cycle.

According to the second aspect of the present invention, an inverter circuit comprises a first bridge arm having a first sub-bridge arm having a first switch, and a first middle point coupled to the first switch, and a second sub-bridge arm having a second switch, and a second middle point coupled to the second switch, a first inductor having a first terminal coupled to the first middle point, and a second terminal, and a second inductor having a first terminal coupled to the second middle point, and a second terminal coupled to the second terminal of the first inductor and outputting an AC voltage.

Preferably, the circuit further comprises a second bridge arm having a third and a fourth switches and a third middle point, wherein the third and the fourth switches are coupled to the third middle point, the third middle point outputs the AC voltage, the first sub-bridge arm further comprises a first diode coupled to the first middle point, and the second sub-bridge arm further comprises a second diode coupled to the second middle point.

Preferably, the circuit further comprises a first and a second input terminals, wherein each of the first to the fourth switches has a first, a second and a control terminals, each of the first and the second diodes has an anode and a cathode, the second terminal of the first switch and the cathode of the first diode are coupled to the first middle point, the first terminal of the second switch and the anode of the second diode are coupled to the second middle point, the first terminal of the third switch and the second terminal of the fourth switch are coupled to the third middle point, the first terminal of the first switch, the first terminal of the fourth switch and the cathode of the second diode are coupled to the first input terminal, the second terminal of the second switch, the second terminal of the third switch and the anode of the first diode are coupled to the second input terminal, and the first and the second input terminals receive a DC voltage.

According to the third aspect of the present invention, an inverter circuit comprises a first bridge arm having a first sub-bridge arm having a first switch, and a first middle point coupled to the first switch, and a second sub-bridge arm having a second switch, and a second middle point coupled to the second switch, a first inductor having a first terminal coupled to the first middle point, and a second terminal, a second inductor having a first terminal coupled to the second middle point, and a second terminal coupled to the second terminal of the first inductor, and a third inductor having a first terminal coupled to the second terminal of the second inductor, and a second terminal outputting an AC voltage.

Preferably, the circuit further comprises a second bridge arm having a third and a fourth switches and a third middle point, wherein the third and the fourth switches are coupled to the third middle point, the third middle point is also used for outputting the AC voltage, the first sub-bridge arm further comprises a first diode coupled to the first middle point, and the second sub-bridge arm further comprises a second diode coupled to the second middle point.

Preferably, the circuit further comprises a first and a second input terminals, wherein each of the first to the fourth switches has a first, a second and a control terminals, each of the first and the second diodes has an anode and a cathode, the second terminal of the first switch and the cathode of the first diode are coupled to the first middle point, the first terminal of the second switch and the anode of the second diode are coupled to the second middle point, the first terminal of the third switch and the second terminal of the fourth switch are coupled to the third middle point, the first terminal of the first switch, the first terminal of the fourth switch and the cathode of the second diode are coupled to the first input terminal, the second terminal of the second switch, the second terminal of the third switch and the anode of the first diode are coupled to the second input terminal, and the first and the second input terminals receive a DC voltage.

Preferably, each of the first to the third inductors has an inductance, the inductance of the third inductor is larger than both of the respective inductances of the first and the second inductors, the first and the second switches have a first and a second body diodes respectively, the inductance of the first inductor has a lower limit set to prevent from a turn-on of the second body diode when the first switch is turned off and the inductance of the second inductor has a lower limit set to prevent from a turn-on of the first body diode when the second switch is turned off.

The present invention may best be understood through the following descriptions with reference to the accompanying drawings, in which:

DETAILED DESCRIPTION OF THE PREFERRED EMBODIMENT

Figure 1:
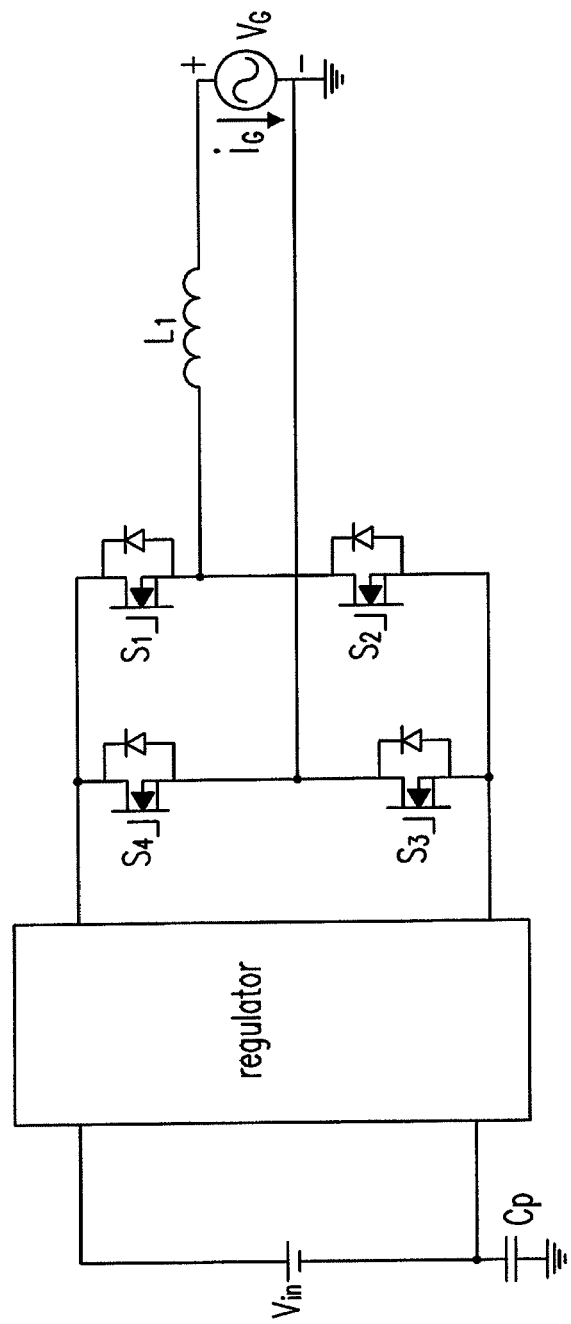
FIG. 1 shows a schematic circuit diagram of a conventional non-isolated inverter circuit.
Figure 2:
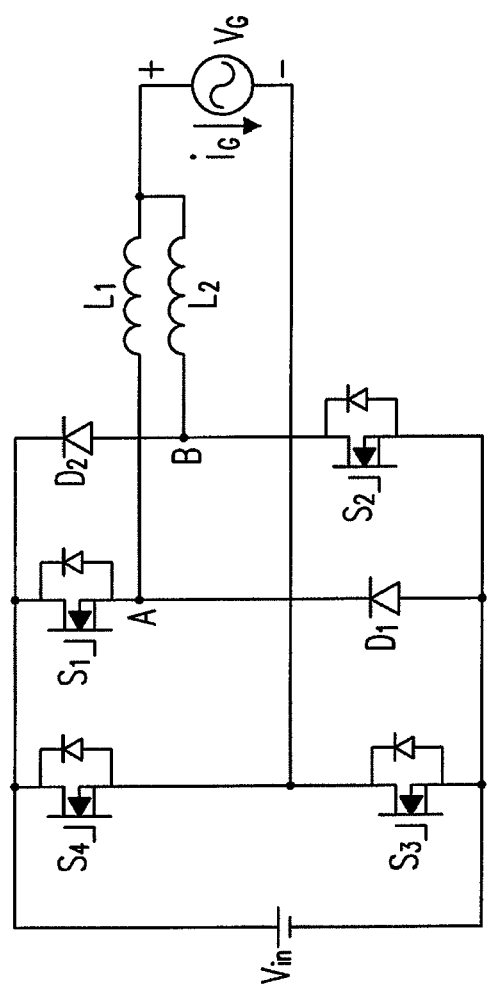
FIG. 2 shows a circuit diagram of an inverter circuit according to the first preferred embodiment of the present invention.

The first preferred embodiment of the present invention is shown in FIG. 2. FIG. 2 shows a circuit diagram of an inverter circuit according to the first preferred embodiment of the present invention. The differences between FIG. 2 and FIG. 1 are that a first diode D1, a second diode D2 and a second inductor L2 are added. In FIG. 2, the switch S1 and the diode D1 are coupled to a first middle point A, the switch S2 and the diode D2 are coupled to a second middle point B, the third switch S3 and the fourth switch S4 are coupled to a third middle point, the first terminals of the inductors L1 and L2 are coupled to the first and the second middle points respectively, the second terminals of the inductors L1 and L2 are commonly coupled to an output terminal, and the output terminal and the third middle point are both used for outputting the AC voltage $V_G$. S1 and S2 could be CoolMOS devices having a rated voltage of 650V, D1 and D2 could be diodes having a rated voltage of 600V, and S3 and S4 could be ordinary MOSFET having a rated voltage of 600V when the input voltage of the inverter circuit, Vin, is 400V. Since the regulator has no influence on the realization of the present invention, the regulator is not shown in details in FIG. 2, but this won't influence one with an ordinary skill in the field to understand the present invention.

Figure 3A:
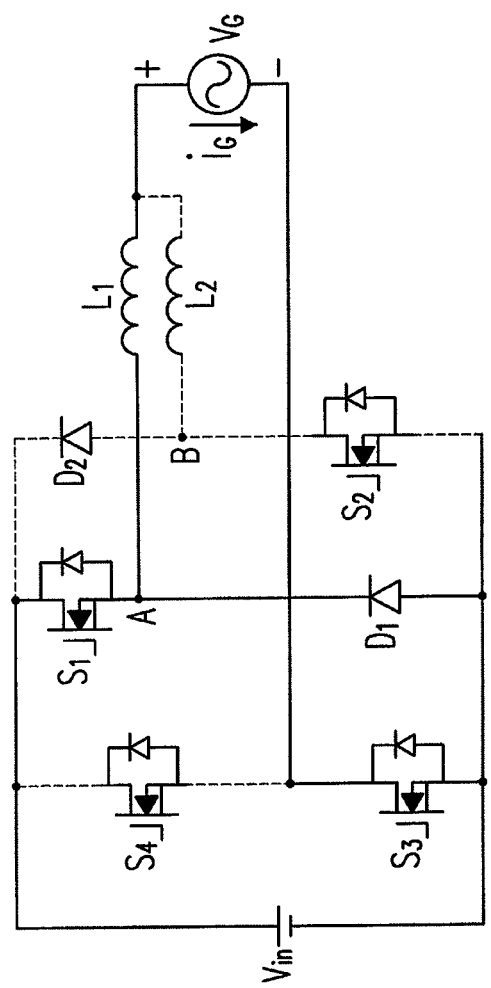
FIG. 3(a) shows an operating circuit of an inverter circuit while the AC output voltage is in a positive half-cycle according to the first preferred embodiment of the present invention.
Figure 3B:
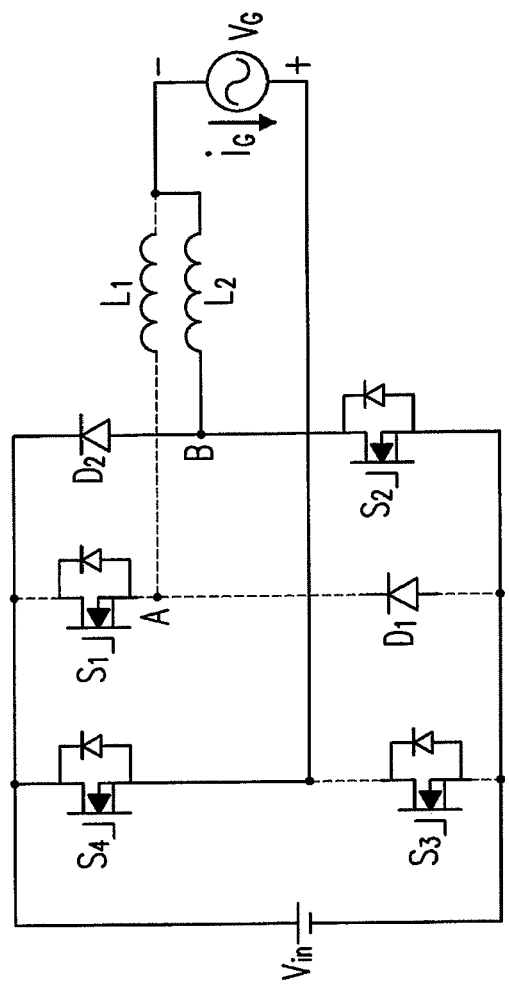
FIG. 3(b) shows an operating circuit of the inverter circuit while the AC output voltage is in a negative half-cycle according to the first preferred embodiment of the present invention.

The operating processes of the present invention are shown in FIGS. 3(a) and 3(b). FIGS. 3(a) and 3(b) respectively show an operating circuit of an inverter circuit while the AC output voltage is in a positive half-cycle according to the first preferred embodiment of the present invention, and an operating circuit of the inverter circuit while the AC output voltage is in a negative half-cycle. The solid lines in FIG. 3(a) show an operating circuit of an inverter circuit (S1, S3, D1 and L1) when the AC output voltage $V_G$ is in a positive half-cycle and is positive, and the dashed lined portion of the inverter circuit shows non-operating circuits (S2, S4, D2 and L2) of the inverter circuit in the positive half-cycle. In FIG. 3(a), S3 is constantly turned on, S1 is employed as a PWM switch, the current flowing through L1 realizes the freewheeling current by flowing through D1 but not through the body diode of the MOSFET when S1 is turned off, and the operating efficiency of the present invention is higher than that of the existing technologies since the characteristic of an independent diode is much better than that of the body diode. For example, the reverse recover time of the independent diode is less than that of the body diode. Similarly, the solid lines in FIG. 3(b) show an operating circuit of the inverter circuit (S2, S4, D2 and L2) when the AC output voltage $V_G$ is in a negative half-cycle and is negative, the dash-lined portion shows non-operating circuits of the inverter circuit in the negative half-cycle (S1, S3, D1 and L1), and at this time, S4 is constantly turned on, S2 is employed as a PWM switch, the freewheeling current is provided by D2 when S2 is turned off. Thus, employing the provided circuit of the present invention would raise the operating efficiency of the inverter to over 98%, and even to 98.5%, much higher than the operating efficiency of the existing technologies.

Figure 4:
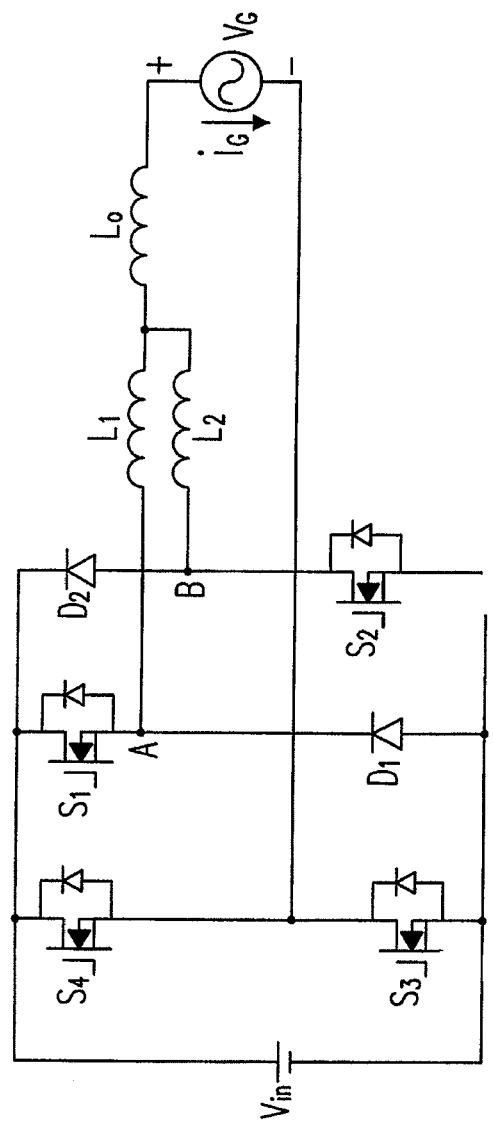
FIG. 4 shows a circuit diagram of an inverter circuit according to the second preferred embodiment of the present invention.

Since the magnetic elements such as an inductor would have a relatively larger volume and a relatively higher cost, the second preferred embodiment according to the present invention is provided as shown in FIG. 4 to further decrease the cost of the present invention. The difference between the second preferred embodiment as shown in FIG. 4 and FIG. 2 is that a third inductor Lo is added. The first terminal of the third inductor Lo connects the second terminals of the first and the second inductors L1 and L2, and the second terminal of the third inductor Lo connects the output terminal for outputting the AC voltage $V_G$. Lo>>L1=L2, and the inductances of L1 and L2 could be very small, but have a lower limit set to prevent from a turn-on of the body diodes of the MOSFETs. In the present invention, the inductances of L1 and L2 could be set at half that of Lo. So, L1 and L2 could be selected from inductors having quite small inductance to decrease not only the volume but also the cost.

According to the aforementioned descriptions, the present invention provides an inverter circuit having a relatively higher efficiency. When a PWM switch of the inverter circuit is turned off, there is an independent diode being employed to realize the freewheeling current instead of a body diode inside the PWM switch such that the efficiency of the inverter circuit is increased. And through employing three inductors with relatively smaller inductances, both the total volume and the total cost of the inverter circuit are decreased so as to possess the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. An inverter circuit, comprising:
   a first bridge arm having:
      a first sub-bridge arm having a first switch, a first diode, and a first middle point coupled to the first switch and the first diode; and
      a second sub-bridge arm having a second switch, a second diode; and a second middle point coupled to the second switch and the second diode;
   a first inductor having a first terminal coupled to the first middle point, and a second terminal; and
   a second inductor having a first terminal coupled to the second middle point, and a second terminal coupled to the second terminal of the first inductor and outputting an AC voltage.

2. A circuit according to claim 1 further comprising a second bridge arm having a third and a fourth switches and a third middle point, wherein the third and the fourth switches are coupled to the third middle point, and the third middle point outputs the AC voltage.

3. A circuit according to claim 2 further comprising a first and a second input terminals, wherein each of the first to the fourth switches has a first, a second and a control terminals, each of the first and the second diodes has an anode and a cathode, the second terminal of the first switch and the cathode of the first diode are coupled to the first middle point, the first terminal of the second switch and the anode of the second diode are coupled to the second middle point, the first terminal of the third switch and the second terminal of the fourth switch are coupled to the third middle point, the first terminal of the first switch, the first terminal of the fourth switch and the cathode of the second diode are coupled to the first input terminal, and the second terminal of the second switch, the second terminal of the third switch and the anode of the first diode are coupled to the second input terminal.

4. A circuit according to claim 3, wherein the first and the second input terminals receive a DC voltage.

5. A circuit according to claim 4, wherein the DC voltage is an output voltage of a solar cell.

6. A circuit according to claim 3 further comprises a regulator receiving a first DC voltage and generating a second DC voltage, wherein the first and the second input terminals receive the second DC voltage.

7. A circuit according to claim 6, wherein the first DC voltage is an output voltage of a solar cell.

8. A circuit according to claim 2, wherein each of the first to the fourth switches is a MOSFET.

9. A circuit according to claim 2, wherein each of the first and the second switches is a CoolMOS device, and each of the third and the fourth switches is an ordinary MOSFET.

10. A circuit according to claim 2 further comprising a third inductor having a first terminal coupled to the second terminal of the second inductor and a second terminal outputting the AC voltage, wherein each of the first to the third inductors has an inductance, the inductance of the third inductor is larger than both of the respective inductances of the first and the second inductors, the first and the second switches have a first and a second body diodes respectively, the inductance of the first inductor has a lower limit set to prevent from a turn-on of the second body diode when the first switch is turned off and the inductance of the second inductor has a lower limit set to prevent from a turn-on of the first body diode when the second switch is turned off.

11. A circuit according to claim 2, wherein the first switch is used as a first PWM switch, the first diode provides a first follow current when the first switch is turned off, and the third switch is turned on constantly while the AC voltage is in a positive half-cycle, the second switch is used as a second PWM switch, the second diode provides a second follow current when the second switch is turned off, and the fourth switch is turned on constantly while the AC voltage is in a negative half-cycle.

12. An inverter circuit, comprising:
a first bridge arm having:
a first sub-bridge arm having a first switch, and a first middle point coupled to the first switch; and
a second sub-bridge arm having a second switch, and a second middle point coupled to the second switch;
a first inductor having a first terminal coupled to the first middle point, and a second terminal; and
a second inductor having a first terminal coupled to the second middle point, and a second terminal coupled to the second terminal of the first inductor and outputting an AC voltage.

13. A circuit according to claim 12 further comprising a second bridge arm having a third and a fourth switches and a third middle point, wherein the third and the fourth switches are coupled to the third middle point, the third middle point outputs the AC voltage, the first sub-bridge arm further comprises a first diode coupled to the first middle point, and the second sub-bridge arm further comprises a second diode coupled to the second middle point.

14. A circuit according to claim 13 further comprising a first and a second input terminals, wherein each of the first to the fourth switches has a first, a second and a control terminals, each of the first and the second diodes has an anode and a cathode, the second terminal of the first switch and the cathode of the first diode are coupled to the first middle point, the first terminal of the second switch and the anode of the second diode are coupled to the second middle point, the first terminal of the third switch and the second terminal of the fourth switch are coupled to the third middle point, the first terminal of the first switch, the first terminal of the fourth switch and the cathode of the second diode are coupled to the first input terminal, the second terminal of the second switch, the second terminal of the third switch and the anode of the first diode are coupled to the second input terminal, and the first and the second input terminals receive a DC voltage.

15. An inverter circuit, comprising:
a first bridge arm having:
a first sub-bridge arm having:
a first switch;
a first middle point coupled to the first switch; and
a first diode coupled to the first middle point; and
a second sub-bridge arm having:
a second switch;
a second middle point coupled to the second switch; and
a second diode coupled to the second middle point;
a first inductor having a first terminal coupled to the first middle point, and a second terminal;
a second inductor having a first terminal coupled to the second middle point, and a second terminal coupled to the second terminal of the first inductor; and
a third inductor having a first terminal coupled to the second terminal of the second inductor, and a second terminal outputting an AC voltage.

16. A circuit according to claim 15 further comprising a second bridge arm having a third and a fourth switches and a third middle point, wherein the third and the fourth switches are coupled to the third middle point, and the third middle point is also used for outputting the AC voltage.

17. A circuit according to claim 16 further comprising a first and a second input terminals, wherein each of the first to the fourth switches has a first, a second and a control terminals, each of the first and the second diodes has an anode and a cathode, the second terminal of the first switch and the cathode of the first diode are coupled to the first middle point, the first terminal of the second switch and the anode of the second diode are coupled to the second middle point, the first terminal of the third switch and the second terminal of the fourth switch are coupled to the third middle point, the first terminal of the first switch, the first terminal of the fourth switch and the cathode of the second diode are coupled to the first input terminal, the second terminal of the second switch, the second terminal of the third switch and the anode of the first diode are coupled to the second input terminal, and the first and the second input terminals receive a DC voltage.

18. A circuit according to claim 15, wherein each of the first to the third inductors has an inductance, the inductance of the third inductor is larger than both of the respective inductances of the first and the second inductors, the first and the second switches have a first and a second body diodes respectively, the inductance of the first inductor has a lower limit set to prevent from a turn-on of the second body diode when the first switch is turned off and the inductance of the second inductor has a lower limit set to prevent from a turn-on of the first body diode when the second switch is turned off.

* * * * *